Feb. 4, 1941. A. E. CARLSON Re. 21,705

MULTIPLE VISION CLOCK

Original Filed Oct. 5, 1936

INVENTOR
ANTHONY E. CARLSON
BY
Fred W. Hamm
ATTORNEY.

Reissued Feb. 4, 1941 Re. 21,705

UNITED STATES PATENT OFFICE 21,705

MULTIPLE VISION CLOCK

Anthony E. Carlson, deceased, late of Los Angeles, Calif., by Edna L. Carlson, assignee, Los Angeles, Calif.

Original No. 2,188,872, dated January 30, 1940, Serial No. 104,093, October 5, 1936. Application for reissue July 5, 1940, Serial No. 344,171

14 Claims. (Cl. 58—126)

The invention relates to indicating devices and instruments, such as clocks, and relates in particular to a face construction for such devices and instruments having a relatively wider angle of visibility than heretofore afforded.

It is characteristic of common types of indicating devices, such as clocks, having a single face with indicia thereon that the indication of values by the position of a pointer or hand relative to the face of the instrument can best be read when the face of the instrument is viewed from a position substantially straight ahead on a line extending at an angle of 90° to the face. As the viewer moves to the side, the face of the instrument is seen at an angle, and perception of the time indicated thereby becomes more difficult as the viewer moves farther to the side of a centralized position. To enable readability from positions widely separated, clocks, for example, have been provided with multiple faces, that is, with faces projecting in different directions. Such construction, of course, involves more or less expense as each face must be provided with a hand or hands and means for operatively connecting the hand or hands to the indicating mechanism. It is an object of the invention to provide an indicating device or instrument having a single face and a single hand or set of hands, but having a much wider range of readability than is found in common single faced devices and instruments, this improvement being accomplished with small increase in cost of construction for the reason that only one face is employed, and therefore only one hand or set of hands and only one driving means therefor are necessary.

It is a further object of the invention to provide an indicating device or instrument having a face across which an indicating pointer or set of hands is movable by a suitable actuating mechanism, there being bodies projecting forwardly from the face preferably in spaced arrangement around a circle and in such a position as to indicate gradations of value. Each of these bodies has a pair of oppositely disposed walls or faces, that is one wall or face facing leftward and another wall or face facing rightward, these walls or faces having indicia, such as numbers, thereon indicating intervals of time. These projections or bodies may be viewed from the front or may be viewed from the right or left along lines of vision extending close to parallel to the plane defined by the face. The device or instrument having a face of this character is especially suitable for use between two positions ordinarily occupied by observers. For example, a clock constructed in accordance with the invention may be placed on a stand or table between twin beds with its face facing along a line extending longitudinally between the twin beds. The occupant of either bed may readily observe the time without the necessity of reaching out and turning the clock so as to face him. In another example, a single instrument on a craft such as an airplane or boat may be read accurately by different observers at positions spaced so far apart as to require viewing the instrument from widely diverging angles. Such a single instrument may be employed instead of duplicate instruments heretofore necessary.

It is a further object of the invention to provide an indicating device or instrument of the character set forth with an enlargement or knob on the end portion of the indicating pointer or pointers which may be clearly seen when the device or instrument is viewed from one side at a small angle of vision.

It is a further object of the invention to provide a clock or other indicating device in which the enlargements on the two hands are respectively positioned so that they will traverse circles smaller and larger than the circle defined by the projection or bodies carrying the indicia.

Further objects and advantages of the invention will be evident throughout the following part of the specification.

While it is to be understood that the present invention is applicable widely to indicating devices and instruments having dials and pointers, it is deemed sufficient for the purpose of disclosure to direct the present description specifically to a clock construction. Those skilled in the art will find sufficient guidance herein for applying the invention to indicating devices in general wherever it may be found useful.

Referring to the drawing, which is for illustrative purposes only:

Figure 1:
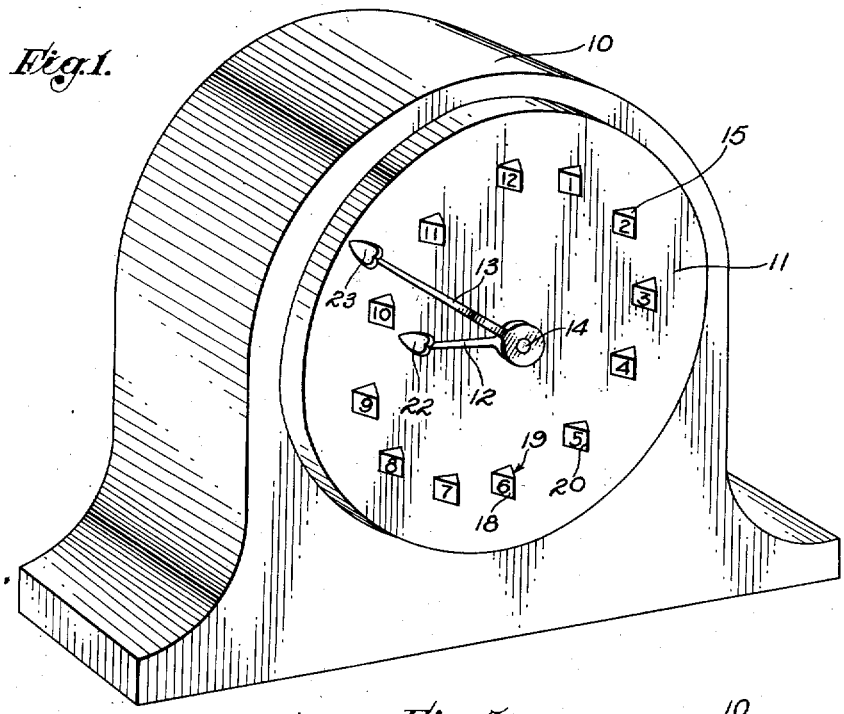
Fig. 1 is a perspective view of a clock embodying a preferred form of the invention.

In Fig. 1 is shown a clock 10 having a circular face 11, with an hour-hand 12 and a minute-hand 13 supported on a centralized shaft means 14 so as to be rotated across the face 11. The shaft means 14 is connected to any suitable clock mechanism, either mechanically or electrically driven as may be desired. The works of the clock 10 are not shown, since the various types thereof are well known.

Projecting forwardly from the face 11 are a plurality of bodies 15 which are spaced apart in a manner to define a closed path in centralized relation to the axis around which the hands 12 and 13 rotate. The projections 15 may define a polygon, or, as shown in Fig. 1, they may define a circle, and the projections 15 are spaced apart so that the positions thereof will represent intervals of time. In the form of the invention shown, twelve projections 15 are employed and are spaced apart at angles of 30° of revolution around the shaft 14 so that the positions thereof represent the twelve hours of a half-day.

Figure 4:
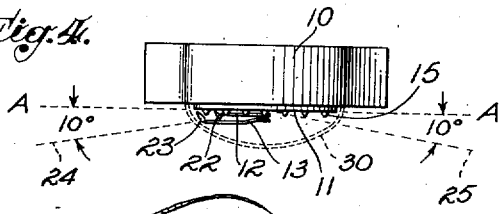
Fig. 4 is a plan view of the clock, at reduced scale.
Figure 2:
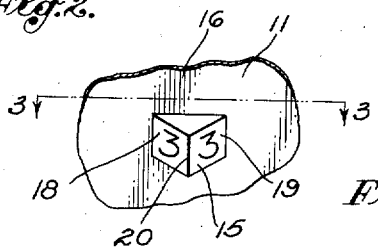
Fig. 2 is an enlarged fragmentary view showing one of the projections or bodies in perspective.
Figure 3:
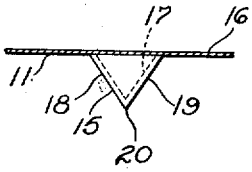
Fig. 3 is a section taken as indicated by the line 3—3 of Fig. 2.

As shown in Figs. 2 and 3, the face 11 may be formed by a flat wall 16, and the projections or bodies 15 may be hollow as indicated by dotted lines 17. The bodies 15 define volumes of space having the form of triangular prisms placed with the axes thereof substantially vertical, so that the three side walls or faces of each prism lie in vertical planes. The prismoidal bodies 15 are each placed so that two walls or faces 18 and 19 thereof will converge forwardly from the plane defined by the face 11, to meet at a vertical edge 20. In the form of the invention shown in Figs. 1, 2, and 3, the time indicating numerals "1" to "12" are employed in pairs, one of each numeral being placed on a wall or face 18 and a wall or face 19 of the proper prismoidal body 15. Accordingly, one of each numeral may be viewed from the left, as shown in Fig. 1, the other numeral may be viewed from the right, and both numerals on each body 15 are visible when the face of the clock 11 is viewed from a position directly ahead of the same, for example, as shown in Fig. 2. The hands 12 and 13 are provided with enlargements or knobs 22 and 23 on the end portions thereof, these knobs or bodies being of such size and being so disposed as to be clearly visible when the clock is being viewed along lines of vision 24 and 25 indicated in Fig. 4, such lines 24 and 25 being shown at angles of approximately 10° from the plane A—A of the face of the clock. The hand 12 is of such length that the body 22 on the end thereof will describe a circle smaller than the circle defined by the projecting bodies 15, and therefore the enlargement or body 22 will move within the circle of projections 15. The hand 13 is preferably deflected outwardly, as shown in Fig. 4, so that as it moves it will clear the forward edges 26 of the projections 15. This hand 13 is of such length that the enlargement or knob 23 on the end thereof will describe a circle larger than the circle of projections 15 and will accordingly travel around the face 11 of the clock outside of the circle of projections 15. By use of the structural or physical characteristics hereinbefore described, a clock is provided by which the time indicated by the hands due to their positions relative to the projections 15 may be discerned or read from a low angle of vision, which may be even smaller than the angle of 10° shown in Fig. 4.

The clock 10 is shown as being open-faced character, that is, without a glass cover or bezel. An additional feature of the invention is the provision of a glass cover having transparent wall portions which extend from a plane spaced ahead of the plane A—A rearwardly at least as far as the plane A—A so that no opaque wall will be interposed in the line of vision 24 or the line of vision 25. The cover of the clock in this practice of the invention may be of cup form, as indicated by dotted lines 30 in Fig. 4.

Figure 5:
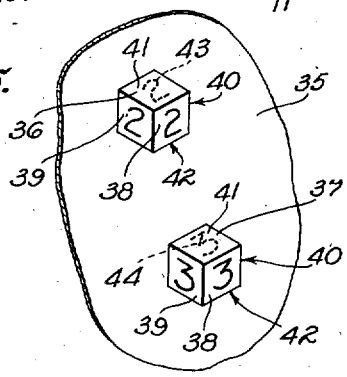
Fig. 5 is a fragmentary perspective view showing a portion of a clock face having a different form of projections thereon.

Although in the preferred practice of the invention the projections 15 are of triangular prismoidal form, such projections may be otherwise formed. For example, in Fig. 5 is shown a portion of a clock face 35 having projecting members 36 and 37 which are of cuboidal form, one wall or face of each member 36 and 37 lying in the vertical plane defined by the face 35. Each member 36 and 37 has five exposed walls or faces comprising a front wall or face 38, side walls or faces 39 and 40, and top and bottom walls or faces 41 and 42, the walls or faces 38, 39, and 40 being vertical and each having a numeral placed thereon indicative of the time. When the clock face 35 is being viewed from a position straight ahead, the front walls or faces 38 of the projections 36 and 37 are visible to the observer. When the clock face 35 is viewed angularly from the left, the side walls or faces 39 and the numerals thereon are visible. Likewise, when the clock face 35 is viewed angularly from the right, the rightward walls or faces 40 of the projections 36 and 37 and the numerals thereon will be visible to the observer. It very naturally follows that numerals, such as indicated by dotted lines 43 and 44, may be placed on the remaining walls or faces of the projecting members 36 and 37.

Although the invention is herein shown and described in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

The invention is claimed as follows:

1. In a multi-vision clock of the character described for indicating time at low angles of vision, the combination of: a face; a plurality of bodies projecting forwardly from said face, said bodies being disposed in spaced relation so that the spacing thereof will represent intervals of time, and said bodies each having a pair of oppositively presented indicia of time thereon; and a pair of hands supported so as to move relative to said bodies whereby the positions of said hands relative to said bodies will indicate time, said hands having enlargements on the end portions thereof disposed so as to be visible along a low angle of vision relative to said clock face.

2. In a multi-vision clock of the character described for indicating time at low angles of vision, the combination of: a plurality of triangular prisms placed in a closed path and being spaced apart so that the positions thereof will represent intervals of time, said prisms being placed with their axes vertical and each with two side faces thereof diverging rearwardly from a vertical, forwardly disposed edge, there being time designating indicia on said side faces of said prisms; and an hour-hand and a minute-hand having means for moving the same relative to said prisms, said hour-hand having a knob positioned thereon so as to move through a path smaller than the path defined by said prisms, and said minute-hand having a knob positioned thereon so as to move through a path larger than the path defined by said prisms.

3. A device of the class described having: a face member; indicia members projecting from said face member and having indicia faces inclined from the plane of said face member to provide visibility of indicia thereon at low angles of sight relative to said plane; and pointer means including an inclined indicating end disposed to mask at least portions of said indicia faces at said low angles of sight.

4. In a multi-vision clock of the character described for indicating time at low angles of vision, the combination of: a face; a plurality of bodies projecting forwardly from said face, said bodies being disposed in spaced relation so that the spacing thereof will represent intervals of time, said bodies each having a pair of indicia of time disposed at opposite angles relative to said clock face to be legible at relatively low angles of vision; and a pair of hands supported so as to move relative to said bodies whereby the positions of said hands relative to said bodies will indicate time, said hands having indicating faces disposed at an angle to said clock face so as to be visible with reference to said indicia along low angles of vision relative to said clock face.

5. In a multi-vision clock of the character described for indicating time at low angles of vision, the combination of: a face; a plurality of bodies projecting forwardly from said face, said bodies being disposed in spaced relation so that the spacing thereof will represent intervals of time, said bodies each having a pair of oppositely directed indicia of time thereon; and a pair of hands supported so as to move relative to said bodies whereby the positions of said hands relative to said bodies will indicate time, said hands having angularly disposed enlargements on the end portions thereof whereby said enlargements may be visible along a low angle of vision relative to said clock face, one of said enlargements being positioned so as to move in a path inside the path defined by the centers of said bodies, and the other of said enlargements being positioned so as to move in a path outside the path defined by the centers of said bodies.

6. A clock having: a face member; time indicia members projecting from said face member, the projecting extremities of said indicia members defining a plane spaced from said face member; a minute indicator intersecting said plane; an hour indicator also intersecting said plane; and means for carrying said indicators whereby said indicators move in circumferential paths on opposite sides of the projecting extremities of the indicia members.

7. In a multi-vision clock of the character described for indication time at low angles of vision, the combination of: a face; a plurality of bodies projecting forwardly from said face, said bodies being disposed in spaced relation so that the spacing thereof will represent intervals of time, said bodies each having a pair of oppositely presented indicia of time thereon; and a pair of hands supported so as to move relative to said bodies whereby the positions of said hands relative to said bodies will indicate time, all the opaque parts of said clock, except said hands, that are more distant from the center of the clock than said bodies being rearward of the plane of said clock face.

8. In a multi-vision indicating instrument for indicating values at low angles of vision, the combination of: a plurality of bodies projecting forwardly from a face plane, said bodies being disposed at spaced positions representing gradations of value, each of said bodies having a face with an indicia of value thereon, said indicia face being inclined relative to said face plane to make said indicia legible at relatively low angles of vision relative to said face plane; and a pointer supported so as to move relative to said bodies whereby the position of said pointer relative to said bodies will indicate values, said pointer having an enlargement on the end portion thereof disposed so as to be visible along a low angle of vision relative to said face plane.

9. In a multi-vision indicating instrument for indicating values at low angles of vision, the combination of: a face; a plurality of bodies projecting forwardly from said face, said bodies being disposed in spaced relation so that the spacing thereof will represent selected values, and said bodies each having a pair of oppositely presented indicia of values thereon; and a pointer supported so as to move relative to said bodies whereby the position of said pointer relative to said bodies will indicate values, said pointer having an enlargement on the end portion thereof disposed so as to be visible along a low angle of vision relative to said face.

10. In a multi-vision indicating instrument for indicating values at low angles of vision, the combination of: a plurality of triangular prisms placed in a closed path and being spaced apart so that the positions thereof will represent graduated values, said prisms being placed with their axes vertical and each with two side faces thereof diverging rearwardly from a vertical forwardly disposed edge, there being value designating indicia on said side faces of said prisms; and a pointer having means for moving the same relative to said prisms, said pointer having an enlargement positioned thereon so as to move through a path larger than the path defined by said prisms whereby the position of said enlargement relative to said bodies may be observed at relatively low angles of vision.

11. In a multi-vision indicating instrument for indicating values at low angles of vision, the combination of: a face, a plurality of bodies projecting forwardly from said face, said bodies being disposed in spaced relation so that the spacing thereof will represent gradations of value, said bodies each having an indicia of value disposed at an angle relative to said face to be legible at low angles of vision relative to said face; and a pointer disposed to move relative to said bodies whereby the positions of said pointer relative to said bodies will indicate values, said pointer having an indicating face disposed at an angle to said instrument face so as to be visible with reference to said indicia along low angles of vision relative to said instrument face.

12. In a multi-vision indicating instrument for indicating values at low angles of vision, the combination of: a face; a plurality of bodies projecting forwardly from said face, said bodies being disposed in spaced relation so that the spacing thereof will represent gradations of value, said bodies each having a pair of oppositely directed indicia of value thereon; and a pointer supported so as to move relative to said bodies whereby the positions of said pointer relative to said bodies will indicate values, said pointer having an angularly disposed enlargement on the end portion thereof whereby said enlargement may be visible along a low angle of vision relative to said face.

13. An indicating instrument of the character described having: a face member; value indicia members projecting from said face member, the projecting extremities of said indicia members defining a plane spaced from said face member; a first indicator intersecting said plane; a second indicator also intersecting said plane; and means for carrying said indicators whereby said indicators move in circumferential paths on opposite sides of the projecting extremities of the indicia members.

14. In a multi-vision indicating instrument for indicating values at low angles of vision, the combination of: a plurality of bodies projecting forwardly from a face plane, said bodies being disposed at spaced positions representing gradations of value, each of said bodies having a face with an indicia of value thereon, said indicia face being inclined relative to said face plane to make said indicia legible at relatively low angles of vision relative to said face plane; and a pointer means supported so as to move relative to said bodies whereby the positions of said pointer means relative to said bodies will indicate values, all the opaque parts of said instrument, except said pointer means, that are more distant from the center of the instrument than said bodies being rearward of the plane of said instrument face.

EDNA L. CARLSON,
*Assignee of the Estate of Anthony E. Carlson, Deceased.*